US008565913B2

(12) United States Patent
Emanuel et al.

(10) Patent No.: US 8,565,913 B2
(45) Date of Patent: Oct. 22, 2013

(54) APPARATUS AND METHOD FOR ASSET TRACKING (75) Inventors: David C. Emanuel, Newark, DE (US); Larry G. Mahan, Newark, DE (US); Richard H. Ungerbuehler, Middletown, DE (US)

(73) Assignee: Sky-Trax, Inc., New Castle, DE (US)

( * ) Notice: Subject to any disclaimer, the term of this patent is extended or adjusted under 35 U.S.C. 154(b) by 580 days.

(21) Appl. No.: 12/321,836

(22) Filed: Jan. 26, 2009

(65) Prior Publication Data
US 2009/0198371 A1    Aug. 6, 2009

Related U.S. Application Data (60) Provisional application No. 61/062,317, filed on Jan. 25, 2008.

(51) Int. Cl.
*G06F 19/00* (2011.01)

(52) U.S. Cl.
USPC ........... 700/229; 700/216; 700/225; 600/246; 340/572.1; 701/1

(58) Field of Classification Search
USPC ........... 700/13–215, 218, 225, 226, 228, 229; 382/305, 306
See application file for complete search history.

(56) References Cited

U.S. PATENT DOCUMENTS

| | | | |
|---|---|---|---|
| 4,684,247 A | 8/1987 | Hammill, III | |
| 5,525,883 A | 6/1996 | Avitzour | |
| 5,604,715 A | 2/1997 | Aman et al. | |
| 5,617,335 A | 4/1997 | Hashima et al. | |
| 5,793,934 A | 8/1998 | Bauer | |
| 5,832,139 A | 11/1998 | Batterman et al. | |
| 5,893,043 A | 4/1999 | Moehlenbrink et al. | |
| 6,150,921 A * | 11/2000 | Werb et al. .................... | 340/10.1 |
| 6,411,210 B1 | 6/2002 | Sower et al. | |
| 6,556,722 B1 | 4/2003 | Russell et al. | |
| 6,661,449 B1 | 12/2003 | Sogawa | |

(Continued)

FOREIGN PATENT DOCUMENTS

| | | |
|---|---|---|
| EP | 0367526 | 5/1990 |
| EP | 1437636 | 7/2004 |

OTHER PUBLICATIONS

International Search Report dated Oct. 14, 2011.
International Search Report dated Nov. 6, 2006.

*Primary Examiner* — Gene Crawford
*Assistant Examiner* — Kyle Logan
(74) *Attorney, Agent, or Firm* — Pepper Hamilton LLP (57) ABSTRACT

An apparatus and method for tracking the location of one or more assets, comprising an integrated system that identifies an asset, determines the time the asset is acquired by a conveying vehicle, determines the position, elevation and orientation of the asset at the moment it is acquired, determines the time the asset is deposited by the conveying vehicle, and determines the position, elevation and orientation of the asset at the time the asset is deposited, each position, elevation and orientation being relative to a reference plane. Mobile subsystems, each on a conveying vehicle, identify the location and orientation of that conveying vehicle using an optical position sensor unit viewing an array of optical position markers, determine the identity of the asset from a label, confirm acquisition of the asset, determine the elevation of the asset relative to the reference plane and communicate the tracking information to a fixed-base subsystem.

11 Claims, 11 Drawing Sheets

System Diagram (56) References Cited

U.S. PATENT DOCUMENTS

| | | |
|---|---|---|
| 6,697,761 B2 | 2/2004 | Akatsuka et al. |
| 6,728,582 B1 | 4/2004 | Wallack |
| 6,732,045 B1 | 5/2004 | Irmer |
| 6,801,245 B2 | 10/2004 | Shniberg et al. |
| 6,902,113 B2 | 6/2005 | Sali et al. |
| 6,922,208 B2 | 7/2005 | Shniberg et al. |
| 6,952,488 B2 | 10/2005 | Kelly et al. |
| 7,119,687 B2 * | 10/2006 | Paulsen et al. ............ 340/572.1 |
| 7,194,330 B2 * | 3/2007 | Carson ......................... 700/214 |
| 7,370,803 B2 | 5/2008 | Mueller et al. |
| 7,372,451 B2 | 5/2008 | Dempski |
| 7,667,646 B2 | 2/2010 | Kalliola et al. |
| 7,681,796 B2 | 3/2010 | Cato et al. |
| 7,845,560 B2 | 12/2010 | Emanuel et al. |
| 2003/0034396 A1 | 2/2003 | Tsikos et al. |
| 2003/0094495 A1 | 5/2003 | Knowles et al. |
| 2003/0208297 A1 * | 11/2003 | Stawikowski et al. ........ 700/219 |
| 2004/0016077 A1 | 1/2004 | Song et al. |
| 2004/0139806 A1 * | 7/2004 | Christmas ................ 73/862.041 |
| 2004/0183751 A1 | 9/2004 | Dempski |
| 2005/0046584 A1 | 3/2005 | Breed |
| 2005/0256608 A1 * | 11/2005 | King et al. .................... 700/213 |
| 2005/0269412 A1 | 12/2005 | Chiu et al. |
| 2006/0022872 A1 | 2/2006 | Zimmerman |
| 2006/0184013 A1 * | 8/2006 | Emanuel et al. .............. 600/426 |
| 2006/0210115 A1 | 9/2006 | Nemet |
| 2007/0021864 A1 * | 1/2007 | Mountz et al. ................ 700/216 |
| 2007/0027585 A1 * | 2/2007 | Wulff ................................ 701/1 |
| 2007/0219720 A1 | 9/2007 | Trepagnier et al. |
| 2007/0282482 A1 * | 12/2007 | Beucher et al. ............... 700/225 |

* cited by examiner

System Diagram

FIGURE 1

Vehicle Components and Optical Position Markers

FIGURE 2

Mobile Subsystem Block Diagram

FIGURE 3

Server Components

Figure 4

Server Block Diagram

Optical Position Marker Detail

FIGURE 8

Load Identification Label L

FIGURE 9

APPARATUS AND METHOD FOR ASSET TRACKING

Priority of U.S. Provisional Application 61/062,317, filed Jan. 25, 2008, is claimed.

RELATED APPLICATIONS

PCT/US2005/043755, published as WO2006/065563, Method and Apparatus for Determining Position and Rotational Orientation of an Object.

U.S. application Ser. No. 12/319,825, Mahan, et al., filed Jan. 13, 2009, Optical Position Marker Apparatus.

BACKGROUND OF THE INVENTION

Tracking the identity and location of physical assets is a critical requirement in many businesses. In material handling facilities such as factories, warehouses, and distribution centers, asset tracking is the primary task of a wide variety of systems, including inventory control systems and warehouse management systems. The ability to automatically determine and record the identity, position, elevation, and rotational orientation of assets within a defined indoor space, without human interaction, is a practical problem. Many solutions, each dedicated toward addressing one or more aspects of the problem have been developed. A number of technologies have been applied to position determination in one, two, and three dimensions. These include optical, ultrasonic, and radio-frequency identification (RFID), but most methods do not provide directional orientation information such as direction or heading. For example, Global Positioning System (GPS) is a widely recognized position determination technology, but it lacks orientation determination capability for stationary objects. GPS operability suffers indoors from signal attenuation and reflections, so it is not a good choice for indoor applications. Ultrasonic methods that operate well indoors have been designed to replicate GPS' capability, but they, too, lack orientation determination.

For example, U.S. Pat. No. 5,604,715 teaches an automated lumber unit tracking system which maintains constant knowledge of the whereabouts of every lumber unit in both a yard and in storage sheds at all times, without the need of affixing any form of device or object to the unit. The system of this patent maintains the location of each and every unit on a constant, real time basis, even as multiple units are being received, moved and shipped by multiple fork lifts at any given instant. This system does not identify the lumber units optically, but merely tracks each unit in the yard.

Rotational orientation determination is not present in many position determination methods, and becomes important in applications such as vehicle tracking and vehicle guidance in order for a guidance system to properly direct the vehicle. Considering materials handling applications, goods may be stored in chosen orientations, for example with carton labels aligned in a particular direction or pallet openings aligned to facilitate lift truck access from a known direction. Goods may be stacked in storage rack locations at elevations above the warehouse floor. The combination of position determination, elevation determination and angular orientation determination using a single sensor is therefore desired. An improved method and apparatus is needed to reduce or remove the shortcomings of current methods, provide general applicability, and offer high accuracy.

A related application, PCT/US2005/043755, published as WO2006/065563, Method and Apparatus for Determining Position and Rotational Orientation of an Object, describes a system that determines a position of an object, such a conveying vehicle, including both location and rotational orientation. Another related application, U.S. Ser. No. 12/319,825, Mahan, et al., filed Jan. 13, 2009, describes an apparatus for marking predetermined known overhead positional locations within a coordinate space, for viewing by an image acquisition system. However, there are no known systems that address all aspects of determining the identity of an asset, as well as its position, elevation, and rotational orientation.

Tracking the movement of assets in an inventory in a storage facility presents a number of additional problems. Most warehouse and distribution centers employ drivers operating fleets of pallet trucks or forklift vehicles. In most of these operations the driver is also responsible for collecting inventory data about specific products that are moved to specific storage locations. Generally these drivers use a hand-held bar code scanner to scan a bar code label on the pallet and a location bar code label that might be on the floor, hung from above, or on a post or rack face. This operation creates three problems:

1) Driver and vehicle productivity are reduced. The label reading task takes time away from the driver's primary task of moving the materials.
2) Data errors can occur. The driver can scan the wrong label, or forget to scan a label, or cannot find a label suitable for scanning. This introduces errors that result in lost inventory, inefficient operations, and operational disruptions.
3) Driver safety is threatened. Forklift drivers work in one of the most dangerous jobs and environments in industry. The scanning operation frequently requires the driver to lean outside the protective driver cage or to dismount and remount the vehicle. The driver is exposed to potential injury when dismounted or leaning outside the protective cage.

In view of the foregoing, an asset tracking system combining automated asset identification, asset position, elevation and angular orientation determination, wireless communication of asset data to a host computer, as well as exchanging these asset data to existing inventory control systems is therefore desired. An improved method and apparatus is needed that mitigates the shortcomings of current methods, provides general applicability, and offers high accuracy.

SUMMARY OF THE INVENTION

An apparatus and method for tracking the location of one or more assets, comprising an integrated system that identifies an asset, determines a time the asset is acquired by a conveying vehicle, determines the position and orientation of the conveying vehicle, determines the position, elevation and orientation of the asset at the moment it is acquired, determines a time the asset is deposited by the conveying vehicle, determines the position and orientation of the conveying vehicle at the time the asset is deposited, and determines the position, elevation and orientation of the asset at the time the asset is deposited, each position, elevation and orientation being relative to a reference plane. The apparatus comprises: a) a fixed-base subsystem; and b) one or more mobile subsystems, each mounted onboard a conveying vehicle.

The fixed-base subsystem comprises: 1) a host computer having a computational unit, a data storage unit, a wireless local area network interface, a communications network interface and an operator interface, 2) a base station wireless local area network communication unit, connected to the computer, for communicating with one or more mobile communication units.

The one or more mobile subsystems, each mounted onboard a conveying vehicle, each comprise: 1) a mobile computer device having a computational unit, a data storage unit, a sensor network interface for communicating with a plurality of onboard devices, a wireless local area network interface, and a driver interface; and 2) a plurality of onboard devices.

The plurality of onboard devices comprise: i) an optical position sensor unit to determine the location in two dimensions and the rotational orientation of the conveying vehicle in a coordinate system on the reference plane; ii) a load identification sensor device for detecting and identifying a label having a machine readable symbol on an asset and decoding the machine readable symbol; iii) a load detection device, indicating the presence or absence of an asset on a lifting mechanism of the conveying vehicle; iv) a lift height detection device for determining the elevation of the lifting mechanism on the conveying vehicle relative to the reference plane; and v) a wireless local area network communication unit for communicating with the base station communication unit.

In operation the fixed-base subsystem communicates with the mobile subsystem on the conveying vehicle to track that conveying vehicle to an origin location of an asset. The asset is detected and identified by the mobile subsystem on the conveying vehicle. The asset is then acquired by the conveying vehicle, the load detection device confirming the presence of the asset on the conveying vehicle. The lift height detection device determines the elevation of the asset relative to the reference plane at the origin location. The conveying vehicle is tracked to deliver the asset to a destination location, the optical position sensor unit determines the location and the rotational orientation of the conveying vehicle, and the lift height detection device determines the elevation of the asset relative to the reference plane at the destination location. The mobile communication unit communicates to the fixed-base subsystem the identity of the asset, the time of acquisition and delivery, and the location, elevation and rotational orientation of the asset at the destination location.

The method of the present invention presents a general solution to the problem of asset location. In the context of the present application an "asset" may include materials such as manufactured goods, in-process semi-finished items or raw materials; industrial utility vehicles such as carts, buggies, lift trucks, or autonomous vehicles; or many other stationary or moveable objects for which location tracking is desired. The apparatus of the present application comprises a system for directing and tracking conveying vehicles, such as forklift trucks, and assets transported by those conveying vehicles, such as stored goods within a warehouse or factory setting. The system determines the instantaneous location of each tracked asset using an array of uniquely encoded position markers distributed throughout the operational space in such a manner that at least one marker is within view of an image acquisition system mounted on a conveying vehicle. Images of the at least one marker are acquired and decoded, and the position and rotational orientation of the conveying vehicle are calculated. Sensors on the conveying vehicle enable the system to determine the precise location, including elevation relative to a reference plane, of the asset (such as an object on a pallet) being transported by the conveying vehicle.

Although intended primarily for indoor use, such as in a warehouse, the apparatus and method of the present invention is also suitable for outdoor use. Whether applied to stationary or mobile assets, the apparatus and method of the present invention is able to determine the location, including a three-dimensional position and rotational orientation of assets with a high degree of precision. While the specific purpose of the apparatus and method of the present invention is to track "assets", i.e., industrial conveying vehicles and storage goods, indoors, it can be applied to track objects of almost any sort, including railcars, heavy equipment, storage containers, people, animals, etc. The apparatus and method can also be applied to map the location of marked objects in designated areas such as archeological sites, excavations, outdoor storage areas, and mines.

Communication between the fixed-base host computer and the mobile subsystems mounted on the conveying vehicles may use any wireless communication protocol authorized for use in a particular country of use. In the U.S. a wireless local area network (WLAN), collectively known as Wi-Fi technology, that operates in the 2.4 Gigahertz (GHz) industrial, scientific and medical (ISM) radio bands in accordance with IEEE standards 802.11b or 802.11g, is preferred.

DETAILED DESCRIPTION OF THE INVENTION

Figure 1:
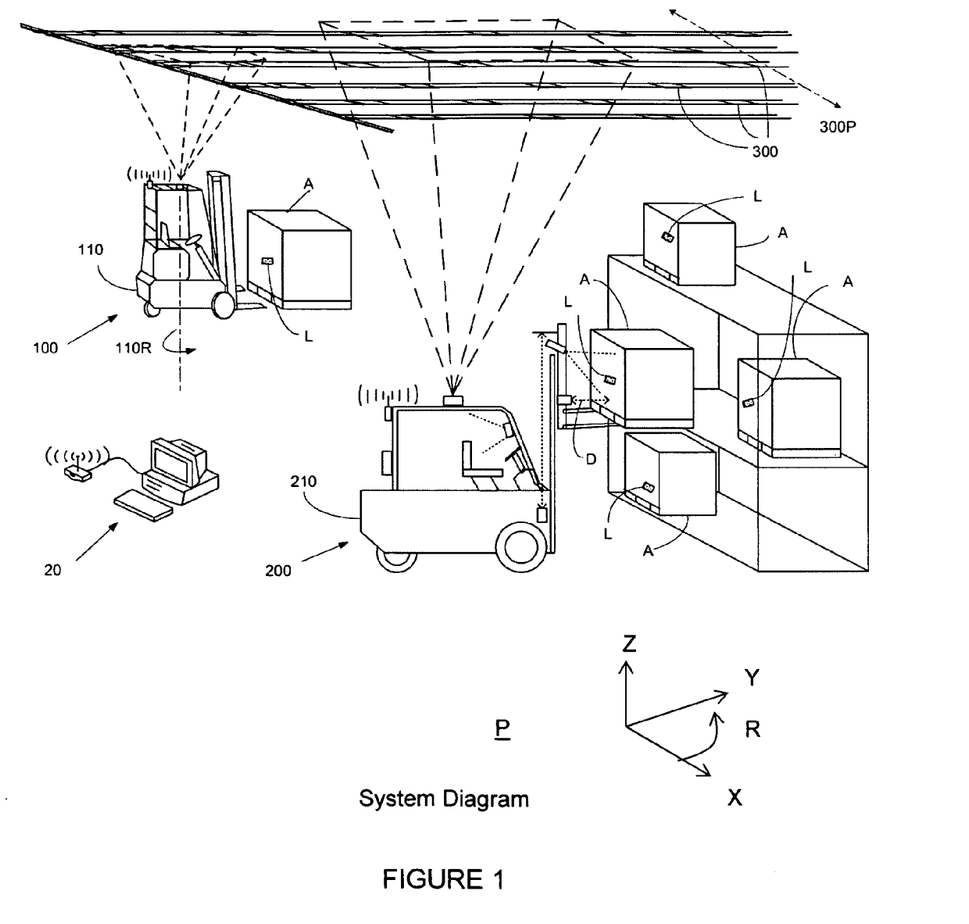
FIG. 1 shows a stylized pictorial view of an asset tracking system in accordance with the present invention, showing a fixed-base subsystem and multiple mobile subsystems each mounted on a conveying vehicle.

As shown in FIG. 1, the apparatus 10 comprises: a) a fixed-base subsystem 20; and b) one or more substantially similar mobile subsystems 100, 200, . . . , N00, each mounted onboard a conveying vehicle 110, 210, . . . , N10. For clarity of illustration only two mobile subsystems 100, 200 are shown, although any practical number may be employed. For simplicity, a single mobile subsystem 100 is described below. Each conveying vehicle has a lifting mechanism 110L for receiving a load, i.e., an asset.

Fixed-Base Subsystem

Figure 4:
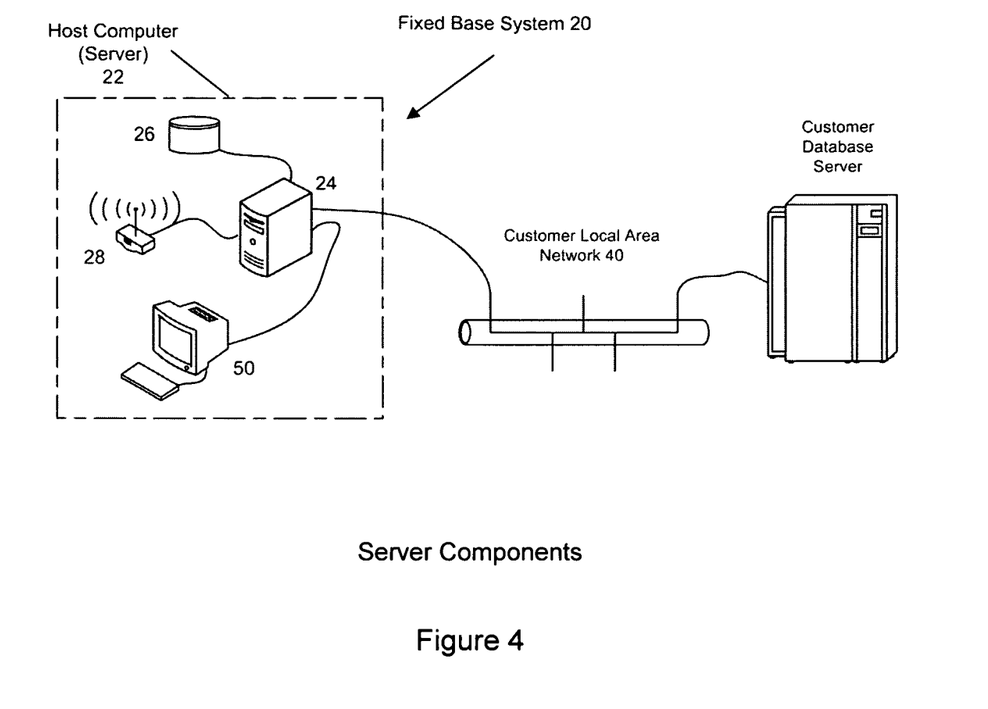
FIG. 4 is a block diagram of the fixed-base subsystem of FIG. 1 showing the components of the host computer.
Figure 5:
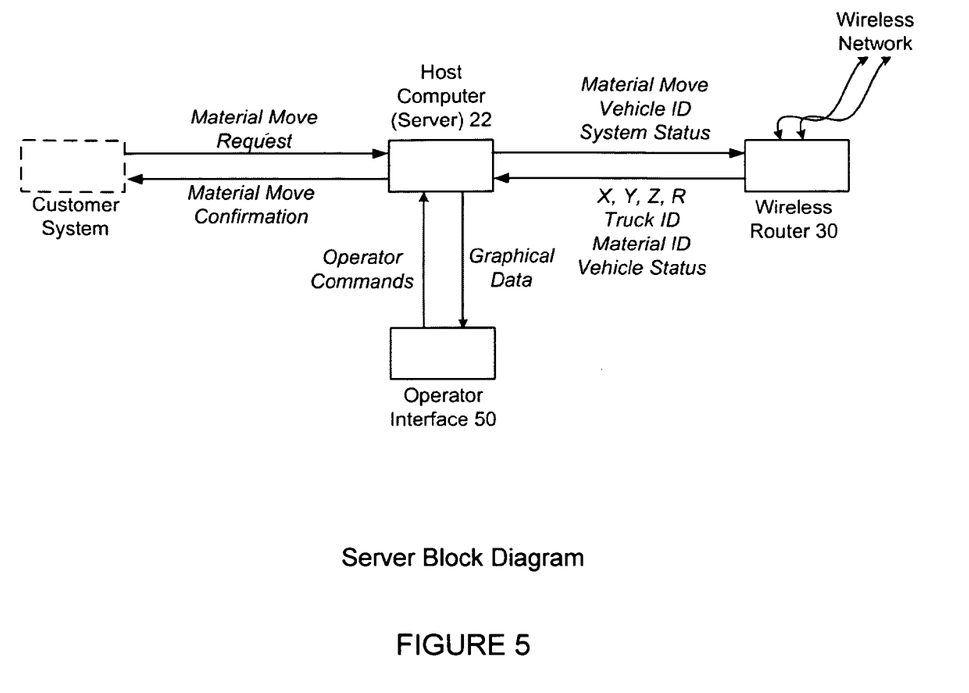
FIG. 5 is a flow diagram depicting a material move request function originated by the host computer.
Figure 6A:
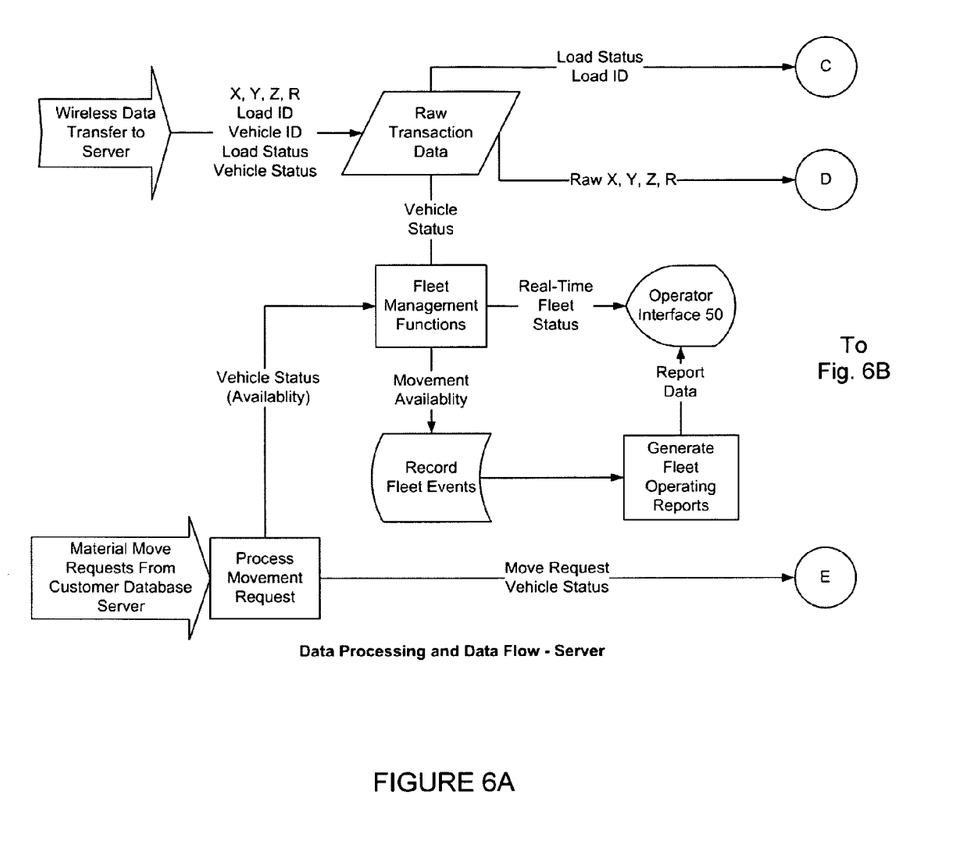
FIGS. 6A and 6B show a flow diagram depicting data processing and data flow associated with FIG. 5.
Figure 6B:
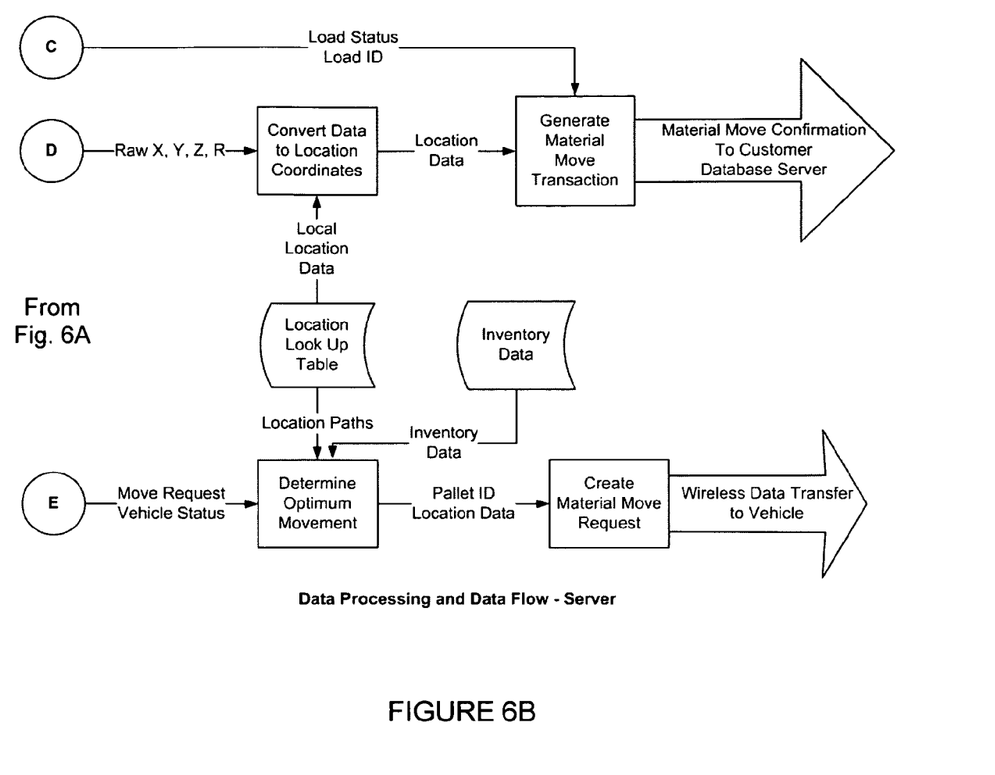
Figure 7A:
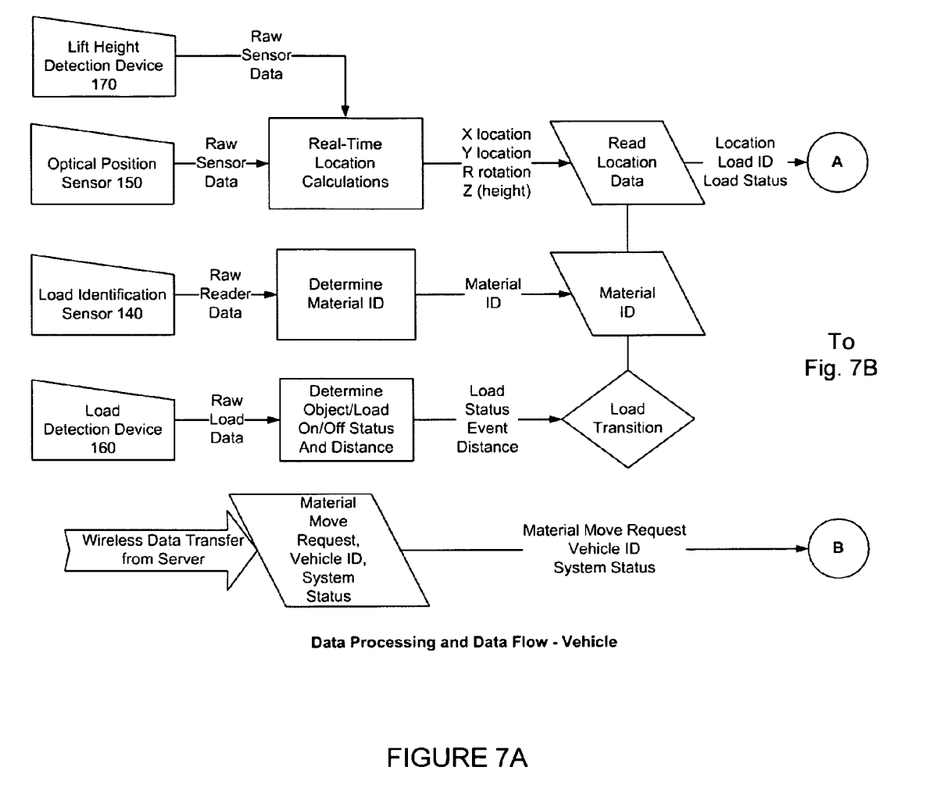
FIGS. 7A and 7B show the data flow of the functions performed by the mobile computer.
Figure 7B:
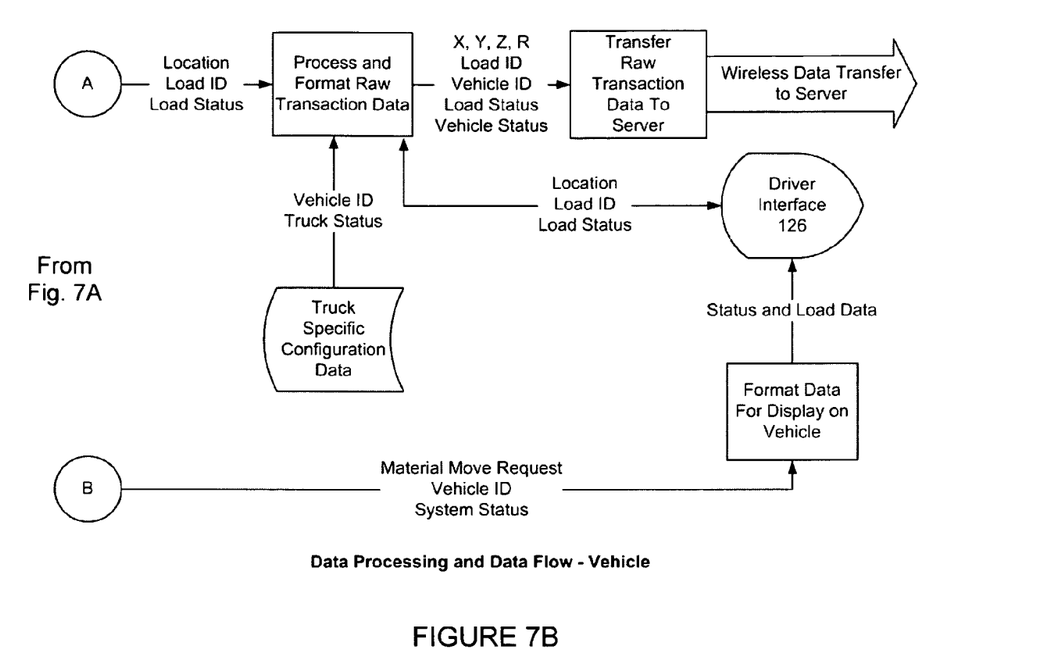

The fixed-base subsystem 20 comprises: 1) a host computer 22 (also termed a server) having a computational unit 24, a data storage unit 26, a wireless local area network interface 28, a communications network interface 40 and an operator interface 50. A base station wireless local area network communication unit 30, also known as a "wireless router", as seen in FIG. 4, is connected to the computer 22 through the interface 28, for communicating with one or more mobile communication units 128, 228, 328 of the mobile subsystems 100, 200, 300, etc. FIG. 4 also shows the host computer being connected to a customer local area network through the communications network interface 40 to a customer database server.

The host computer may be a common personal computer such as an Optiplex 960 desktop computer from Dell Inc. of Austin, Tex., or a common server. Either may utilize Microsoft Windows XP for the operating system, Microsoft SQL Server for the database software, and Microsoft Office 2007 for the standard desktop workstation applications. Reports are generated using a commercial report package such as SAP Business Objects (Crystal Reports), available from SAP America Inc. of Newtown Square, Pa. Custom applications are developed with Microsoft .NET Development Environment, also available from Microsoft Corporation of Redmond, Wash.

The host computer of the fixed base subsystem operates under the control of instructions stored in the data storage unit to perform the functions of: a) receiving data from the wireless local area network interface and computing each conveying vehicle's instantaneous location and orientation based on data received; b) storing and managing short term and long term records of conveying vehicle tracking data, including instantaneous location, directional heading, velocity, presence or absence of an asset load, identification of the asset, distance of the asset from the conveying vehicle and elevation of the lifting mechanism; c) creating a graphical display on the operator interface device of the instantaneous location and load condition of each and every vehicle within the facility; d) receiving commands from the operator interface; and e) communicating data to and from external computer units, such as inventory control systems, warehouse management systems, safety systems, via a communications network.

Mobile Subsystem

Figure 3:
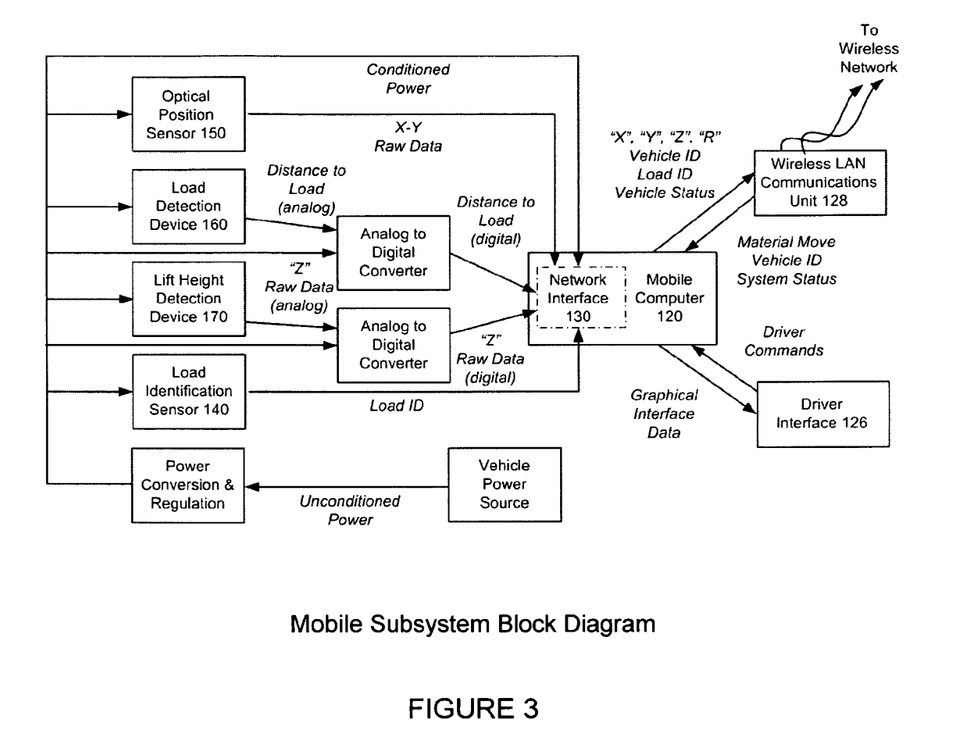
FIG. 3 is a block diagram of the components of the mobile subsystem of FIG. 2.

The mobile subsystem 100 mounted on the conveying vehicle 110 consists of: a mobile computer unit 120, having a computational unit 122, a data storage unit 124, a driver interface 126, a wireless local area network communications unit 128, and a sensor network interface 130 for communicating with a plurality of devices 140, 150, 160, 170 onboard the vehicle 110. The sensor network interface 130 for communicating with the onboard devices may utilize Ethernet, RS-232, USB, or IEEE-1394 hardwired protocol or IEEE 802.15 Bluetooth wireless protocol and may receive analog signals using an analog to digital converter. A typical computer device 120 is the eBox-484 from ICOP Technology, Inc. of El Monte, Calif. The mobile computer utilizes Microsoft Windows XP as the operating system, and custom applications are developed using the Microsoft .NET ("Dot Net") development environment.

The mobile computer device also has provision for the wireless local area network communications unit to provide a wireless link back to the host computer device. A suitable wireless local area network interface is the Netegriti Mini PCI Wireless card model #NTG-EM-50AG-BN-FW available from Discount Technology of San Diego, Calif. The mobile computer unit 120 accumulates the raw sensor data from each of the onboard sensors and may transmit the data in real-time or may store the data in its storage unit 124 for transmission over the wireless network at a later time, such as upon request from the host computer 22.

Load Identification Sensor Device

Figure 2:
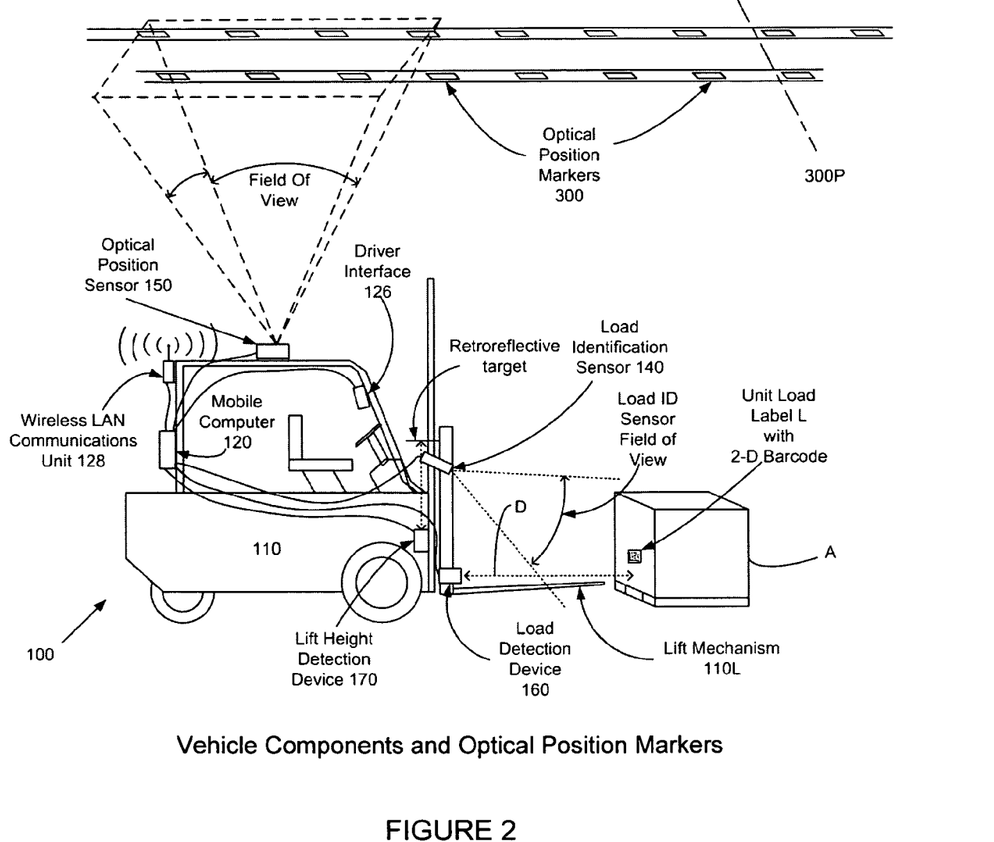
FIG. 2 shows an enlarged view of a conveying vehicle depicting the components of the mobile subsystem.
Figure 9:
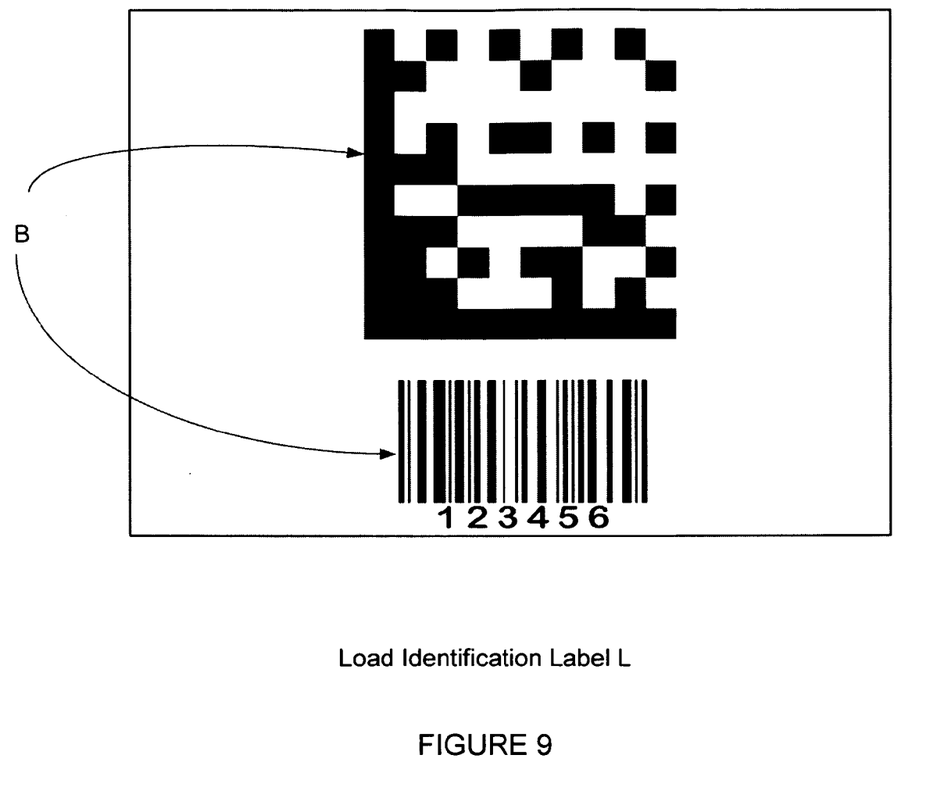
FIG. 9 is a depiction of a typical label used for asset identification.

As best seen in FIG. 2, a load identification sensor 140 is mounted on a conveying vehicle 110 to view an item A, i.e., an asset, as it is acquired or deposited by the conveying vehicle. The sensor 140 automatically recognizes and identifies items that come within the field of view by recognizing a coded label L affixed to each item. This coded label L can be recognized and decoded by the load identification sensor 140, which can recognize and decode both one and two dimensional bar codes B (such as shown in FIG. 9) in any orientation. The preferred embodiment of sensor 140 employs a commercial machine vision system such as Model 5100 or Model 5400 from Cognex, Incorporated. In-Sight Explorer™ Software provided with this system offers a wide array of feature extraction, mathematical, geometric, object identification, and barcode symbol decoding subroutines. Output data are produced at the conclusion of each procedure and may be stored or transferred to the mobile computer unit 120.

The load identification sensor 140 runs automatically and continuously, typically acquiring and analyzing images several times per second. The sensor 140 analyzes each image, determining the size of the label L. When a recognizable bar code B is found, the sensor decodes the bar code, calculates its location within the field of view, and the determines the size of the bar code. The sensor searches the entire image and performs the calculations for all bar codes found within the image. Data for all recognized bar codes is output via a standard computer communication protocol and interface such as Ethernet, RS-232, or USB to the sensor network interface 130 of the mobile computer unit 120.

The load identification sensor 140 consists of the following: 1) a digital image acquisition system, i.e., a digital camera including a lens and optional filter, and image storage system; 2) a digital image processing system, i.e., a computer processing unit having a storage unit for analyzing digital images and extracting information from the image; 3) a lighting system designed to illuminate the scene to be imaged. The lighting system is controlled for timing and intensity by the sensor 140; 4) stored instructions in the storage unit cause the processing unit to analyze a digital image to recognize a bar coded label, to calculate its location and its size; 5) stored instructions control overall operation of the sensor 140 and cause it to output the information in a standard computer system interface protocol; 6) stored instructions to set up and configure the sensor for use in a particular environment and for a particular use; 7) an enclosure suitable for installing the sensor in mobile industrial environments; and 8) an input/output interface for communicating with the mobile computer unit 120.

Optical Position Markers

A plurality of individually unique position markers 300 are arranged at predetermined known positional locations, typically an array. Line of sight obscuration problems are overcome by placing position markers 300 overhead of a reference plane P of the conveying vehicle's 110 motion. In the factory or warehouse setting, the plane 300P of the position markers 300 is placed sufficiently high above the working area so as not to interfere with operations. A preferred arrangement for creating an array of position markers as described in related application Ser. No. 12/319,825, Mahan et al., filed Jan. 13, 2009, incorporated herein by reference. Suspension of the position marker array is provided by mechanical supports such as cables, wire, or building structures.

Figure 8:
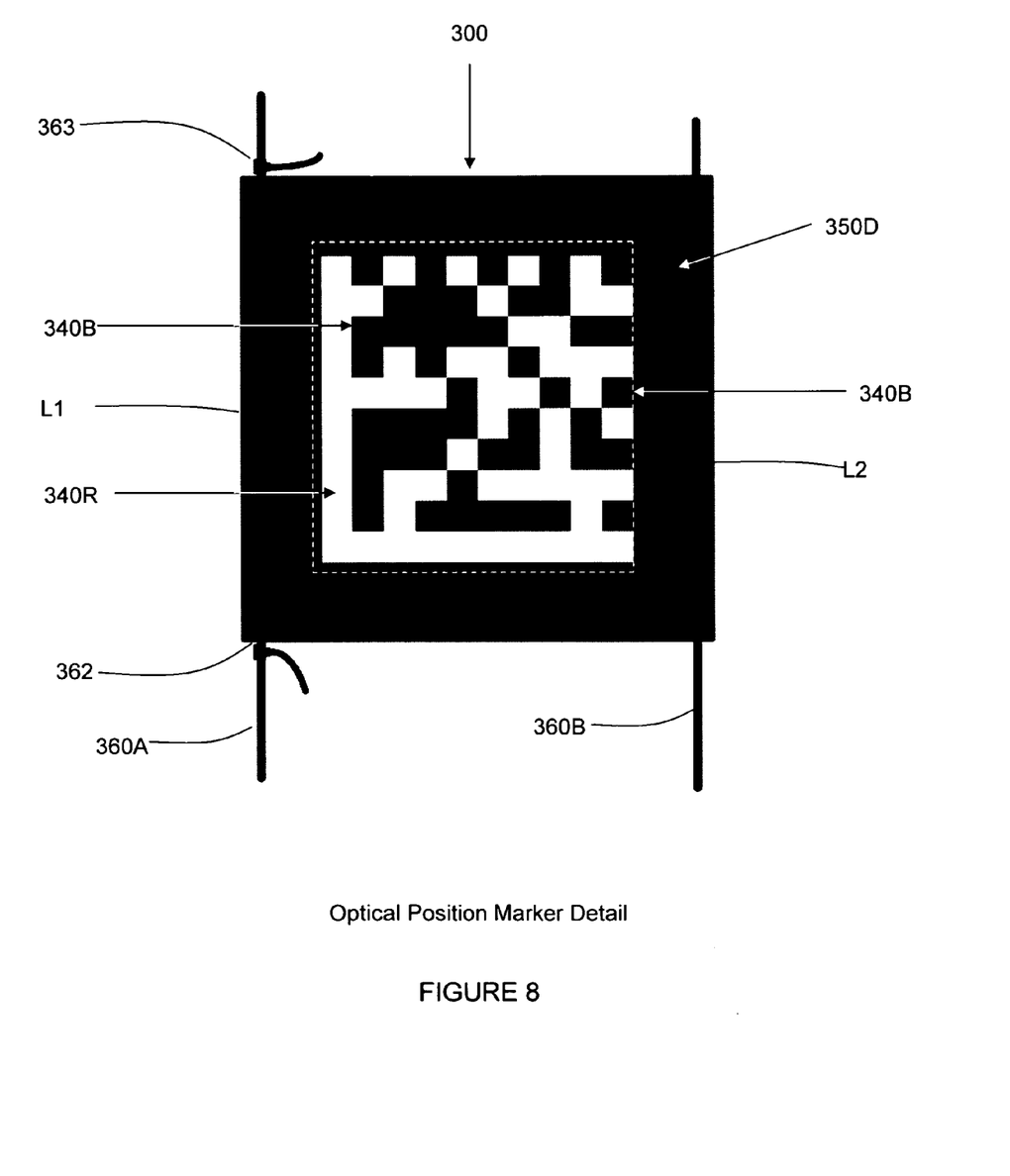
FIG. 8 is a depiction of a typical label used for a position marker.

As may be seen in FIG. 8, a marker tag 300 is created by affixing a label 340, having a barcode symbol 340B and a rotational orientation feature 340R to a substantially stiff substrate 350. The substrate is sized larger than the barcode label to provide a dark border 350D, termed an "optical quiet zone", around each barcode symbol 340B. The marker tags 300 are attached along their lateral edges L1, L2 to a first and second support cords 360A, 360B, using fasteners 362, 363, in a fixed spaced-apart positional arrangement to form rows. As may be seen in FIGS. 1 and 2, the rows are positioned in a spaced-apart manner to form an array of position markers 300.

Optical Position Sensor Unit

An upward facing image acquisition camera of an optical position sensor unit 150 is mounted on the conveying vehicle, acquiring images of at least one position marker 300 within view. Each image is processed to determine the identity of each position marker 300 within view. The location of a position marker within the acquired image is then used to determine the position (typically X and Y coordinates) and rotational orientation R of the conveying vehicle 110. Each position marker 300 (seen in FIGS. 1, 2, and 8) bears a unique barcode symbol 340B (FIG. 8) that contains a rotational orientation feature 340R, thereby identifying both the position coordinate and rotational orientation of the position marker 300 within the predefined coordinate space. The rotational orientation of each position marker relative to the conveying vehicle 110 is used to determine the rotational orientation 110R of the conveying vehicle relative to the coordinate system on the reference plane P.

At least one position marker 300 is within view of the optical position sensor unit 150. Alternatively, images of more than one position marker 300 may be selected, and the position and rotational orientation of the conveying vehicle may be calculated for each selected position marker to verify the calculation and improve the precision of the position and rotational orientation determination.

Image Analysis Performed by the Optical Position Sensor Unit 150

Conventional machine vision technology, such as a commercial machine vision system, such as a Model 5100 or Model 5400 from Cognex, Inc., is utilized to capture and process images of the position markers 300. The machine vision system has image processing capabilities such as marker presence or absence detection, dimensional measurement, and label shape identification. Typical machine vision systems are comprised of a video camera, a computing device, and a set of software routines stored in a storage unit of the computing device. Machine vision equipment is commercially available and suitable for most environments. In order to develop a machine vision application, the user chooses certain subroutines, combines them into a sequence or procedure, and stores the procedure in the memory or storage device of the machine vision computing device. The preferred embodiment uses a Model 5100 or Model 5400 from Cognex, Inc. with associated "In-Sight Explorer™" software that offers a wide array of feature extraction, mathematical, geometric, label identification, and barcode symbol decoding subroutines. Output data produced by the optical position sensor device 150 at the conclusion of each procedure may be stored or transferred to the mobile computer unit 120 through the sensor network interface 130 (FIG. 3).

Upon internal command, typically issued synchronously several times per second, an image is captured by the machine vision camera and stored into its memory. Analysis begins by locating a readable position marker image (image in which the bar code 340B can be decoded) within the field of view. In normal circumstances and by design, at least one position marker 300 will be present within the field of view. Once a position marker 300 has been located, the marker identification is decoded and the data is stored in the machine vision system memory and is available as an output. Marker positions are stored in a look-up table in the mobile computer 120, and the table can be accessed to return the approximate camera position. Thus the approximate location of the camera can be determined by the camera identifying a particular marker within view.

The image is next analyzed to determine the relative location (both X and Y), orientation R, and size of the marker 300 within the field of view. The marker's angular orientation and its azimuth from the center of the field of view are calculated and stored in degrees. Expected position and orientation can then be calculated using plane geometry for markers that directly encode position. Expected position and heading assume the marker's position and orientation are exactly where the encoded value places it. Actual values may differ if the marker 300 is installed slightly offset its intended location or orientation.

The identification of the position marker 300, the relative position of the marker within the field of view, the angular orientation, and the marker dimensions are passed to the mobile computer. The decoded identification serves as a key to access true marker position data, which is obtained from a lookup table in the mobile computer. The marker's actual position is then calculated from the marker's position within the field of view; that is, its distance in pixels from the center of the field of view, and at what azimuth, but using actual positional and orientation values. The results are transformed from pixels into real dimensions such as feet or meters. The results can be saved and/or conveyed to other devices, such as the fixed base host computer 22, for storage, presentation, or other purpose. The cycle repeats once a full determination has been made.

Load Detection Device

A load detection device 160, provides a digital signal indicating the presence or absence of an asset A on a lifting mechanism 110L of the conveying vehicle 110. The load detection device consists of an optical emitter, which produces a light beam, and a receiver, which detects the beam. The emitter and receiver are mounted opposite one another on the inboard edges of the forks of the lifting device of the conveying vehicle, near the fork's verticals and backing plate. When the center rib of a pallet interrupts the beam, the receiver produces an electrical signal to the mobile computer device indicating that a load has been acquired.

The emitter and receiver sensors are low power, long-life solid-state optical devices each enclosed within a metal protective housing. Each housing is adjustably fastened to a mounting plate that is typically welded to the fork faces of the lifting device. Slotted bolt holes allow easy adjustment of the housings forward and backward for optimal placement. Electrical cables connect the emitter and receiver sensors to the mobile computer device.

The preferred load detection device 160, also provides an analog signal indicating the distance D from the conveying vehicle lift apparatus to the material being acquired. As shown in FIG. 2, a laser time-of-flight sensor, comprising a solid-state laser source and self-contained receiver, is mounted in a physically protected position on the lift mechanism backrest. The device operates on the principle that light propagates at a known rate. A beam emanating from a source exits the source at Time t(0) and propagates toward the material being acquired, where it is reflected back, typically from the pallet or object (e.g., asset A) resting on the pallet, toward the source. The time of the beam's reception, Time t(1), is measured very precisely and an analog current or voltage is created in a linear fashion, corresponding to the time of flight. This analog signal is transmitted to an analog to digital converter (FIG. 3) and the digital representation is transmitted to the mobile computer unit 120.

Lift Height Detection Device

A lift height detection device 170 for determining the elevation of the lifting mechanism 110L on the conveying vehicle 110 relative to the reference plane P, typically the warehouse floor. As shown in FIG. 2, a laser time-of-flight sensor, comprising a solid-state laser source and a retroreflector, is mounted on a forklift mast, operated on the principle that light propagates at a know rate. A beam emanating from a source exits the source at Time t(0) and propagates toward a retro-reflective target, where it is reflected back toward the source. The time of the beam's reception, Time t(1), is measured very precisely and a current or voltage is created in a linear fashion, corresponding to the time of flight. This analog signal is transmitted to an analog to digital converter (FIG. 3) that transmits a digital representation of the analog value to the mobile computer unit 120.

The load detection device 160 and lift height detection device 170 work together to determine the moment that as asset A has been acquired or deposited by the conveying vehicle 110 and the elevation of the load relative to the reference plane P. The optical position sensor unit 140 determines the location of the conveying vehicle in two dimensions, along with the conveying vehicle's orientation, and thus, a three dimensional location database is created.

EXAMPLE

When the load detection device 160 indicates a load (asset A) is acquired at Time $t_A$, and the load identification device confirms that the identified load is on board by also determining the load label location relative to the conveying vehicle, the following data is generated within the mobile computer 120:

Acquisition time of load=$t_A$ (typically a date time stamp)
Load ID=123456 (from the Load Identification Sensor Device)
Elevation=0.2 feet (from the Lift Height Detection Device)
X Location=345.2 feet (from the Optical Position Sensor Unit)
Y Location=118.7 feet (from the Optical Position Sensor Unit)
Rotational orientation=94 degrees (from the Optical Position Sensor Unit)

When the load detection device 160 indicates a load is deposited at Time $t_D$ the following data is generated within the mobile computer 120:

Deposition time of load at destination=$t_D$ (typically a date time stamp)
Elevation=17.2 feet (from the Lift Height Detection Device)
X Location=246.5 feet (from the Optical Position Sensor Unit)
Y Location=208.6 feet (from the Optical Position Sensor Unit)
Rotational orientation=180 degrees (from the Optical Position Sensor Unit)

Those skilled in the art, having benefit of the teachings of the present invention asset forth herein, may effect modifications thereto. Such modifications are to be construed as lying within the contemplation of the present invention, as defined by the appended claims.

What is claimed is:

1. An apparatus for tracking the location and rotational orientation of one or more assets, comprising an integrated system that identifies an asset, determines a time the asset is acquired by a conveying vehicle, determines the position and rotational orientation of the conveying vehicle, determines the position, elevation and rotational orientation of the asset at the moment it is acquired, determines a time the asset is deposited by the conveying vehicle, determines the position and rotational orientation of the conveying vehicle at the time the asset is deposited, and determines the position, elevation and rotational orientation of the asset at the time the asset is deposited, each position, elevation and rotational orientation being relative to a reference plane, the integrated system comprising:

a) a fixed-base subsystem comprising:
1) a host computer having a computational unit, a data storage unit, a wireless local area network interface, a communications network interface and an operator interface;
2) a base station wireless local area network communication unit, connected to the computer, for communicating with one or more mobile communication units;
b) one or more mobile subsystems, each mounted onboard a conveying vehicle, each comprising:
1) a mobile computer device having a computational unit, a data storage unit, a network interface for communicating with a plurality of onboard devices, and a wireless local area network interface; and
2) a plurality of onboard devices comprising:
i) an optical position sensor unit to determine the location in two dimensions and the rotational orientation of the conveying vehicle in a coordinate system on the reference plane;
ii) an optical asset identification sensor device having a predetermined field of view mounted on a lifting mechanism of the conveying vehicle for optically recognizing one or more labels within the field of view on one or more assets and identifying each label having an optically machine readable symbol, calculating a location of each label within the field of view, determining a size of each label and decoding each machine readable symbol to identify an asset to be transported;
iii) an optical asset detection device that optically measures the distance from the lifting mechanism to the asset to be transported and indicates the presence or absence of an asset on the lifting mechanism of the conveying vehicle;
iv) a lift height detection device for determining an elevation of the lifting mechanism on the conveying vehicle relative to the reference plane;
v) a wireless local area network communication unit for communicating with the base station communication unit; and
vi) a driver interface for displaying asset move instructions, identification and location of the one or more assets associated with the recognized one or more labels to a driver, and for receiving data from the driver, so that the fixed-base subsystem communicates with the mobile subsystem on the conveying vehicle to optically track that conveying vehicle to an origin location of the asset to be transported, as the conveying vehicle approaches the one or more assets, one or more labels are recognized and decoded until the asset to be transported is optically detected and identified by the mobile subsystem on the conveying vehicle, the identification and location of the asset to be transported is displayed to the driver, the asset to be transported is acquired by the conveying vehicle, the optical load detection device optically confirms the presence of the asset to be transported on the conveying vehicle and optically measures the asset's onboard position relative to the vehicle, the lift height detection device determines the elevation of the asset to be transported relative to the reference plane at the origin location, the mobile communication unit communicates to the fixed-base subsystem the identity of the asset to be transported, a time of acquisition, and a location, elevation and rotational orientation of the asset to be transported at the origin location, the conveying vehicle is optically tracked to deliver the asset to be transported to a destination location, the optical position sensor unit determines the location and the rotational orientation of the conveying vehicle as the asset to be transported is deposited, the lift height detection device determines the elevation of the asset to be transported relative to the reference plane at the destination location, the optical load detection device optically measures the asset's position relative to the vehicle, confirms the absence of the asset to be transported from the conveying vehicle and the mobile communication unit communicates to the fixed-base subsystem the identity of the asset to be transported, the time of delivery, and the location, elevation and rotational orientation of the asset to be transported at the destination location.

2. The apparatus of claim 1 wherein the host computer of the fixed-base subsystem operates under the control of instructions stored in the data storage unit to perform the functions of:
   a) receiving data from the wireless local area network interface and computing each conveying vehicle's instantaneous location and orientation based on data received;
   b) storing and managing short term and long term records of conveying vehicle tracking data, including instantaneous location, directional heading, velocity, presence or absence of an asset load, identification of the asset, distance of the asset from the conveying vehicle and elevation of the lifting mechanism;
   c) creating a graphical display on the fixed-base subsystem operator interface device of the instantaneous location and load condition of each and every vehicle within the facility;
   d) receiving commands from the fixed-base subsystem operator interface; and
   e) communicating data to and from external computer units, such as inventory control systems, warehouse management systems, safety systems, via a communications network.

3. The apparatus of claim 1 wherein the base station wireless local area network communication unit and the mobile local area network communication unit operate in accordance with IEEE standard 802.11b or 802.11g to receive data from each mobile wireless local area network communication unit of each mobile subsystem on each conveying vehicle and the base station wireless local area network communication unit.

4. The apparatus of claim 1 wherein the one or more mobile subsystems each further comprise a mobile onboard computer unit having a computational unit, a data storage unit, a local area network interface and a driver interface, the computer unit operating under control of instructions stored in the data storage unit to receive, analyze, and store data from the optical position sensor unit, the optical load identification device, the optical load detection device, and the lift height detection device, to display data on the driver interface, to receive instructions from the driver interface and to communicate with the host computer of the fixed-base subsystem through the network interface and the wireless local area network communication unit.

5. The apparatus of claim 1 wherein the optical position sensor unit of the mobile subsystem on the conveying vehicle comprises an upward-facing optical image acquisition unit for viewing one or more of a plurality of unique position markers having identifying indicia and positional reference indicia thereupon, the markers being arranged at predetermined positional locations within a coordinate space so that at least one position marker is within view, the image acquisition unit acquires an image of one or more position markers and the optical position sensor unit analyzes the image to determine the location in two dimensions and the rotational orientation of the conveying vehicle relative to the coordinate system.

6. The apparatus of claim 1 wherein the optical load identification device for detecting and identifying an asset comprises a generally horizontal optical label reader sensor on the lifting mechanism of the conveying vehicle facing toward one or more assets that acquires an image of one or more labels on the one or more assets, each label having a machine readable symbol comprising a bar coded symbol thereon, decodes asset identification information of each bar coded symbol, determines the location and pixel size of each label within the image, thereby also optically determining the position of each asset relative to the conveying vehicle, and sends the asset identification and location information to the mobile computer for graphical display on the driver interface.

7. The apparatus of claim 1 wherein the lift height detection device comprises an optical sensor mounted on the conveying vehicle and an optical target mounted on the lifting mechanism to generate a signal corresponding to the elevation of the lifting mechanism above the reference plane.

8. A method of directing the transport of and tracking the location and rotational orientation of one or more assets relative to a reference plane, utilizing a system comprising a fixed-base subsystem having an operator interface and one or more mobile subsystems, each mobile subsystem on a conveying vehicle, each mobile subsystem having an optical position sensor unit, a mobile communication unit, and a driver interface, each conveying vehicle having a lifting mechanism, a lift height detection device, an optical asset identification device having a predetermined field of view mounted on the lifting mechanism and an optical load detection device mounted on the lifting mechanism, the fixed-base subsystem having a host computer with a data storage unit, the method comprising:
   a) identifying the location and rotational orientation of each conveying vehicle using the optical position sensor unit;
   b) communicating the location and orientation of each conveying vehicle to the fixed-base subsystem and displaying the location and orientation on the operator interface;
   c) selecting a conveying vehicle and communicating with the mobile subsystem on the selected conveying vehicle to direct and track the selected conveying vehicle to an origin location of an asset to be transported;
   d) optically recognizing and identifying one or more labels within the field of view on one or more assets and identifying each label having an optically machine readable symbol, optically determining the position of the one or more labels relative to the optical asset identification device and displaying the identification and the position of each label relative to the optical asset identification device on the driver interface of the mobile subsystem of the selected conveying vehicle;
   e) as the driver of the conveying vehicle approaches the one or more assets, repeating step d) until only the label identifying the asset to be transported is displayed on the driver interface;

f) acquiring the asset to be transported, optically measuring the distance from the lifting mechanism to the asset to be transported to determine the position of the asset to be transported relative to the selected conveying vehicle and confirming the presence of the asset to be transported on the lifting mechanism, displaying this status to a driver on the driver interface;

g) directing the selected conveying vehicle to deliver the asset to be transported to a destination location by transmitting instructions to the mobile subsystem for display on the driver interface and tracking the selected conveying vehicle;

h) depositing the asset to be transported at the destination location, determining the elevation of the asset to be transported relative to the reference plane at the destination location, and optically measuring the distance from the lifting mechanism to the asset to be transported and confirming the absence of the asset to be transported from the lifting mechanism and displaying this status to the driver on the driver interface;

i) communicating asset data to the fixed-base subsystem, the asset data comprising the identity, location, elevation and rotational orientation of the asset to be transported at the destination location; and j) storing the asset data in the data storage unit for subsequent use.

9. A method of tracking the location and rotational orientation of one or more assets having one or more labels thereon relative to a reference plane, utilizing a system comprising a fixed-base subsystem and one or more mobile subsystems, each mobile subsystem on a conveying vehicle, each mobile subsystem having an optical position sensor unit, a mobile communication unit, and a driver interface, each conveying vehicle having a lifting mechanism, a lift height detection device and an optical asset identification device having a predetermined field of view mounted on the lifting mechanism of the conveying vehicle, an asset detection device mounted on the lifting mechanism and a fixed-base subsystem having a host computer with a data storage unit, the method comprising:

a) identifying the location and rotational orientation of each conveying vehicle using the optical position sensor unit;

b) communicating the location and rotational orientation of each conveying vehicle to the fixed-base subsystem;

c) upon receipt of an asset delivery request, selecting a conveying vehicle and communicating with the mobile subsystem on the selected conveying vehicle to track the selected conveying vehicle to an origin location of an asset to be transported;

d) optically detecting and identifying one or more labels on one or more assets and optically determining the position of the one or more labels relative to the optical asset identification device and displaying the identification and the position of the one or more labels relative to the optical asset identification device on the driver interface of the mobile subsystem of the selected conveying vehicle;

e) acquiring the asset to be transported, optically measuring the distance from the lifting mechanism to the asset to be transported to determine the position of the asset to be transported relative to the selected conveying vehicle, optically confirming the presence of the asset on the lifting mechanism, displaying this status to a driver on the driver interface;

f) the mobile communication unit communicating to the fixed-base subsystem the identity of the asset to be transported, the time of acquisition, and the location, elevation and rotational orientation of the asset to be transported at the origin location;

g) tracking the selected conveying vehicle to a destination location;

h) depositing the asset to be transported at the destination location, determining the elevation of the asset to be transported relative to the reference plane at the destination location, and optically measuring the distance from the lifting mechanism to the asset to be transported, confirming the absence of the asset to be transported from the lifting mechanism and displaying this status to the driver on the driver interface;

i) communicating asset data to the fixed-base subsystem, the asset data comprising the identity, location, elevation, rotational orientation and deposition time of the asset to be transported at the destination; and j) storing the asset data in the data storage unit for subsequent use.

10. The method of claim 9, wherein the asset delivery request originates from a driver input to the mobile subsystem on a conveying vehicle.

11. The method of claim 9, wherein the asset delivery request originates from the host computer.

* * * * *